United States Patent [19]

Hatanaka et al.

[11] Patent Number: 4,739,202
[45] Date of Patent: Apr. 19, 1988

[54] SUPERCONDUCTING ELECTRIC ROTARY MACHINE HAVING GROOVED INSULATION FOR CARRYING COOLANT

[75] Inventors: Hidenao Hatanaka; Akinori Ueda; Toshiki Hirao; Susumu Maeda; Kouichi Ooshita; Mitsuhiro Uchida, all of Kobe, Japan

[73] Assignee: Mitsubishi Denki Kabushiki Kaisha, Tokyo, Japan

[21] Appl. No.: 9,920

[22] Filed: Feb. 2, 1987

[30] Foreign Application Priority Data

| Mar. 12, 1986 | [JP] | Japan | 61-56312 |
| Mar. 12, 1986 | [JP] | Japan | 61-56311 |
| Mar. 12, 1986 | [JP] | Japan | 61-56313 |
| Mar. 12, 1986 | [JP] | Japan | 61-56314 |
| Mar. 12, 1986 | [JP] | Japan | 61-56318 |
| Mar. 12, 1986 | [JP] | Japan | 61-56319 |
| Mar. 12, 1986 | [JP] | Japan | 61-56320 |
| Mar. 12, 1986 | [JP] | Japan | 61-56321 |
| Mar. 12, 1986 | [JP] | Japan | 61-56324 |
| Mar. 12, 1986 | [JP] | Japan | 61-56325 |

[51] Int. Cl.⁴ .............................................. H02K 9/00
[52] U.S. Cl. ................................. 310/52; 310/54; 310/61; 310/214; 335/216
[58] Field of Search .............. 310/52, 54, 60 A, 61, 310/214, 215; 335/216

[56] References Cited

U.S. PATENT DOCUMENTS

| 4,282,450 | 8/1981 | Eckels | 310/215 |
| 4,315,172 | 2/1982 | Intichar et al. | 310/53 |
| 4,363,981 | 12/1982 | Laskaris | 310/52 |
| 4,363,982 | 12/1982 | Kaminski | 310/214 |
| 4,384,168 | 5/1983 | Kenney | 335/216 |

FOREIGN PATENT DOCUMENTS 55-83439 6/1980 Japan .
55-139053 10/1980 Japan .

Primary Examiner—Patrick R. Salce
Assistant Examiner—D. L. Rebsch
Attorney, Agent, or Firm—Oblon, Fisher, Spivak, McClelland & Maier

[57] ABSTRACT

A rotor for a superconducting electric rotary machine comprises a coil supporting tube, a superconducting wire constituting a superconducting field coil, in-line insulators disposed between the laterally adjacent lines of the wound wire and layer insulators between the vertically adjacent layers of the wound wire of the coil, wherein at least one of the line insulators and the layer insulators is formed by a grooved insulating material or a perforated insulating material.

6 Claims, 10 Drawing Sheets

FIGURE 19
FIGURE 20
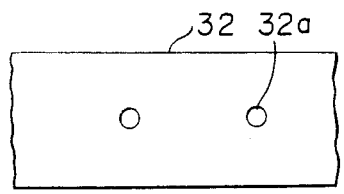
FIGURE 21
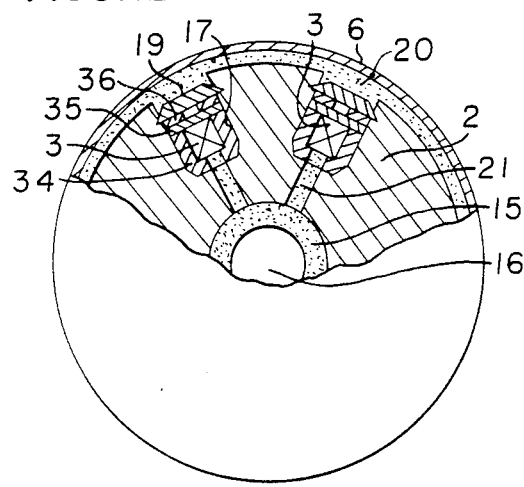
FIGURE 22
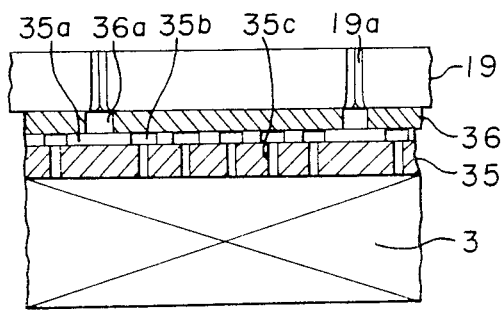

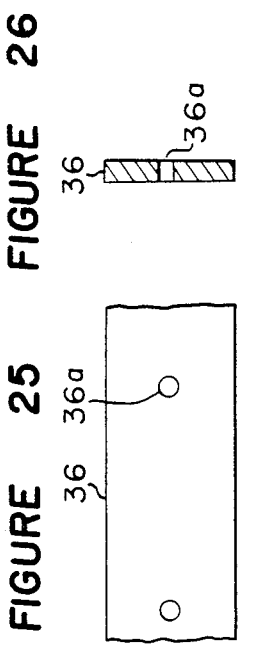
FIGURE 26
FIGURE 25
FIGURE 24
FIGURE 23
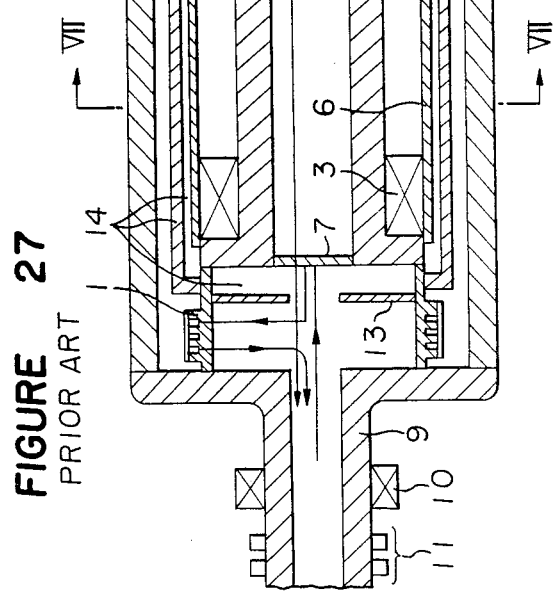
FIGURE 27
PRIOR ART

SUPERCONDUCTING ELECTRIC ROTARY MACHINE HAVING GROOVED INSULATION FOR CARRYING COOLANT

BACKGROUND OF THE INVENTION

1. Field of the Invention

The present invention relates to a superconducting electric rotary machine. More particularly, it relates to a rotor for a superconducting electric machine having a cooling structure for maintaining a superconducting field coil in the rotor under a superconducting transition temperature.

2. Description of Prior Art

As a rotor for a superconducting electric rotary machine of this kind, there has been proposed such a one as shown in Japanese Unexamined Patent Publication No. 22372/1982.

FIG. 27 is a longitudinal cross-sectional view of such rotor. In FIG. 27, reference numerals designate a torque tube 1, a coil supporting tube 2 constituting the intermediate portion of the torque tube 1, a superconducting field coil 3 mounted on the coil supporting tube, an ambient temperature damper 4 (hereinbelow, referred to as first damper 4) which surrounds the torque tube 1 and the coil supporting tube 2, a radiation shielding damper 5 (hereinbelow, referred to as second damper 5) which is disposed between the first damper 4 and the coil supporting tube 2, an outer tube 6 attached to the outer periphery of the coil supporting tube 2 to cover the superconducting field coil 3, a pair of end plates 7 attached to both sides of the coil supporting tube 2, respectively driven and driving end shafts 8 and 9 extending from both sides of the rotor, bearings 10 for supporting the end shafts 8, 9, slip rings 11 for feeding a field current, a heat exchanger 12 formed in one piece with or attached to the torque tube 1, a pair of side plates 13 for shielding radiation, and vacuumed portions 14.

In the rotor of the superconducting electric rotary machine having the above-mentioned construction, when the superconducting field coil 3 mounted on the coil supporting tube 2 is cooled to a cryogenic temperature, the electric resistance of the coil becomes substantially zero and the excitation loss is eliminated, whereby a strong magnetic field is generated by the superconducting field coil 3 and a.c. power is generated from a stator (not shown). In order to cool the superconducting field coil 3 at a cryogenic temperature, liquid helium is supplied from the center bore of the end shaft 9 (which is at the opposite side of the driven end shaft 8) through a feeding tube (not shown) to a liquid helium vessel which is formed by the coil supporting tube 2, the outer tube 6 and end plates 7; spaces 14 in the rotor are kept under a highly vacuumed condition; the torque tube 1 for transmitting a torque to the coil supporting tube 2 with the superconducting field coil 3 cooled at the cryogenic temperature is formed by a thin cylindrical body and is provided with a heat exchanger 12 or heat exchangers 12, so that heat invading through the torque tube 1 to the cryogenic temperature portion is reduced to a minimum. The side plates 13 are so provided that heat of radiation from the side of the end plate 9 can be reduced.

The first and second dampers 4, 5 are adapted to shield a magnetic field having high harmonics from the stator to protect the superconducting field coil 3 and adapted to attenuate the vibrations of the rotor due to a disturbance in the power system. In addition, the first damper 4 functions as a vacuum outer tube, and the second damper 5 functions as a radiation shield to the helium vessel portion. In FIG. 27, piping for constituting a helium introduction and discharge system for the rotor and a helium introduction and discharge device connected to the rotor are omitted.

FIG. 28 is a cross-sectional view of a part of the torque tube 1 taken along the line VII—VII. In FIG. 28, numerals designate a section for storing the liquid helium 15, a space 16 in which vapor helium is filled, a slot 17 receiving a part of the superconducting field coil 3 mounted on the coil supporting tube 2, an earth insulator 18 between the superconducting field coil 3 and the coil supporting tube 2, a wedge 19 for fixing the coil 3, an opening 20 formed between the coil supporting tube 2 and the outer tube 6, helium passage 21 for communicating the section for storing the liquid helium 15 with the slot 17, and through-holes 22a, 22b in, for instance, circular form which are formed in the earth insulator 18.

As a superconducting field coil used for the rotor having the construction as above-mentioned, there has been proposed such a one as disclosed in, for instance, Japanese Unexamined Patent Publication No. 186960/1982. FIG. 29 shows the superconducting field coil disclosed in the above-mentioned publication.

In FIG. 29, the superconducting field coil 3 is formed by winding a superconducting wire 3a on the coil supporting tube 2 in plural numbers of lines and layers. The superconducting wire 3a is formed by twisting a plurality of electric wire elements. A numeral 23 designates in-line insulators inserted between adjacent rows of the wound superconducting wire 3a and numeral 24 designates layer insulators inserted between vertically adjacent layers of the wound superconducting wire. The insulators 23, 24 are made of an insulating plate-like material, not having any grooves or apertures. The in-line insulators 23 and the layer insulators 24 are inserted between laterally adjacent superconducting wire 3a and vertically adjacent layers of the superconducting wire 3a one by one, while the single superconducting wire is wound. On completion of winding operations, the wound body is treated by an epoxy resin in a molded form, whereby spaces between the adjacent superconducting wire 3a are filled with insulation to prevent a short circuit.

Generally, in the superconducting electric rotary machine, there is a technical problem as to how the superconducting field coil is cooled at a cryogenic temperature. It is necessary to cool the coil below the superconducting transition temperature in order to keep the coil in the superconducting condition. The cooling operation is carried out by using helium as a cooling medium to give a temperature range of from 1 K to 20 K (the absolute temperature scale). However, since the specific heat of the superconducting field coil becomes extremely small in such cryogenic temperature condition, the temperature of the coil increases even by a small amount of heat produced in the coil or by leakage of a small amount of heat into the coil, whereby the temperature of the superconducting field coil may exceed the superconducting transition temperature. Accordingly, an important point in design of the superconducting electric rotary machine resides in how the heat produced in the coil itself and the heat invading the coil can be quickly removed.

The heat in the coil 3 or the heat entering into the coil 3 is absorbed by the helium which fills small gaps between the superconducting field coil 3 and the earth insulators 18 surrounding the coil 3. When the helium absorbs the heat, volume expansion is caused. Thus, the helium, having a small density, passes through the holes 22a formed in the earth insulator 18 due to natural convection in a centrifugal force field and then, it flows into the helium liquid storing section 15 through the helium passage 21 in the coil supporting tube 2. On the other hand, shortage of helium is caused in spaces around the superconducting field coil 3. Accordingly, the area around the superconducting field coil 3 is supplied with the helium which flows from the opening 20 communicated with the inner space of the outer tube 6 through gaps in the wedge 19 and the through hole 22b of the earth insulator 18. The helium which reaches the liquid storing section 15 has a lesser density and is subjected to partial evaporation and cooling. The cooled helium is circulated through a course of another helium passage 21, another through-hole 22a in the earth insulator 18, the area around the coil 3, another through hole 22b in the earth insulator 18, gaps in the wedge 19 and the opening 20.

Thus, the cooling of the superconducting field coil 3 is carried out by natural circulation as above-mentioned so that it is kept at a temperature lower than the superconducting transition temperature.

However, the conventional superconducting electric rotary machine had the problem as described below. Namely, since the cooling of the superconducting field coil 3 is carried out only from the side of its outer circumferential surface, when heat is produced in the superconducting wire 3a constituting the coil 3, the heat in the superconducting wire 3a has to be removed to the outer circumference of the coil 3 through the in-line insulators 23, the layer insulators 24 and the superconducting wire 3a by the cooling function of the helium around the coil 3. Accordingly, the poor cooling effect in the conventional machine causes increase in the temperature of the superconducting wire 3a with the consequence of inviting the breaking (quenching) of the superconducting condition.

There has been known a technique as shown in FIGS. 30 and 31 (which is proposed by, for instance, Japanese Unexamined Patent Publication No. 202852/1982) in order to remove the heat produced in the superconducting field coil and the heat entering it. In FIGS. 30 and 31, the same reference numerals as in FIGS. 27 to 29 designate the same or corresponding parts. In FIGS. 30 and 31, a reference numeral 30a designates a plurality of circular through holes formed in an upper insulating packing, a numeral 31a designates a plurality of circular through holes formed in a lower insulating packing 31 and a numeral 38 designates a side insulating packing provided at the side part of the superconducting field coil 3 in the slot 17. However, in the rotor having the construction as above-mentioned, the through holes 30a of the upper insulating packing 30 and the through holes 31a of the lower insulating packing 31 are respectively formed in the radial direction with respect to the coil supporting tube 2, and the distances between the through holes 30a and between the through holes 31a are relatively large with respect to the axial direction of the coil supporting tube 2. In this case, a pass for transmitting heat produced in the superconducting field coil 3 in which the through holes 30a, 31a are relatively close to a heat generating part is more advantageous than a path in which the through holes 30a, 31a are relatively remote. Accordingly, when a small amount of heat is produced or enters at a position remote from the through holes 30a or 31a, it is difficult for the helium which absorbs the heat to flow through the helium passage in the coil supporting tube 2. Then, the temperature of the coil 3 increases, thereby to cause the quenching.

In the rotor having such construction that the superconducting field coil 3 is held in the slot 17 formed in the coil supporting tube 2 and the coil 3 is kept at the superconducting transition temperature or lower, it is necessary to provide insulators having a sufficient insulating properties so as not to cause the break down of insulation, because a voltage of several hundreds to about 1000 volts takes place if the superconducting condition is lost (there is substantially no voltage in the superconducting field coil 3 under the superconducting condition).

For cooling the superconducting field coil, it is considered that through holes 30a or 31a are formed in the upper and/or lower insulating packing 30, 31 to pass the helium. However, formation of the through holes 30a, 31a reduces insulating properties. In order to prevent the reduction of the insulating properties, the thickness of the upper and/or lower insulating packing 30, 31 is increased to provide a sufficient insulating length. However, the insulating packings occupy a large volume in the slot 17. This involves reduction of the space for the duper ducting field coil 3, with the consequence that the capacity of the superconducting field coil 3 decreases. This is a great problem in the function of the superconducting electric rotary machine. If parts in the slot 17 other than the insulators have the same volume, the depth of the slot 17 has to be large for the increased thickness of the upper and/or the lower insulating packing 30, 31. This makes the conventional machine non-efficient.

SUMMARY OF THE INVENTION

It is an object of the present invention to provide a rotor for a superconducting electric rotary machine capable of increasing cooling effect and preventing the quenching of the superconducting field coil.

It is another object of the present invention to provide a rotor for a superconducting electric rotary machine which easily removes heat produced in the coil, to thereby improve the performance of the superconducting field coil.

The present invention provides a rotor for a superconducting electric rotary machine comprising a coil supporting tube, a superconducting field coil which is formed by winding a superconducting wire around the coil supporting tube in plural numbers of lines and layers with in-line insulators between the laterally adjacent lines of the wound wire, and layer insulators between the vertically adjacent layers of the wound wire of the coil, wherein at least one of the in-line insulators and the layer insulators is formed by a grooved insulating material or a perforated insulating material.

In another aspect of the present invention, there is provided a rotor for a superconducting electric rotary machine comprising a coil supporting tube, a superconducting field coil held in a slot formed in the coil supporting tube, and upper and lower insulating packings respectively placed on the outer and inner circumferential surfaces of the superconducting coil, wherein each of the upper and lower insulating packings is provided with a surface having at least one groove formed in the axial direction of the coil supporting tube and at least one groove formed in the circumferential direction of the coil, and a plurality of holes formed in the grooves so as to communicate with the other surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 19 is a plane view of the inner layer of the lower insulating packing shown in FIG. 16;

FIG. 20 is a cross-sectional view of the inner layer of the lower insulating packing;

FIG. 21 is a cross-sectional view showing a rotor for a superconducting electric rotary machine according to the tenth embodiment of the present invention;

FIG. 22 is an enlarged cross-sectional view showing the upper part of a superconducting field coil shown in FIG. 21;

FIG. 23 is a plane view showing the inner layer of an upper insulating packing used for the rotor of the present invention;

FIG. 24 is a cross-sectional view of the inner layer of the upper insulating packing shown in FIG. 22;

FIG. 25 is a plane view showing the outer layer of an upper insulating packing;

FIG. 26 is a cross-sectional view of the upper layer of the upper insulating packing;

FIG. 27 is a longitudinal cross-sectional view showing a conventional rotor for a superconducting electric rotary machine;

DETAILED DESCRIPTION OF PREFERRED EMBODIMENT

Figure 1:
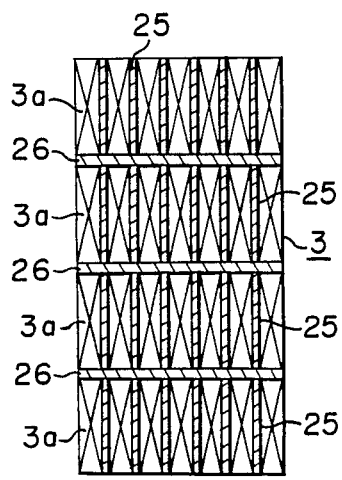
FIG. 1 is a diagram in cross-section of an embodiment of the superconducting field coil mounted on the rotor for a superconducting electric rotary machine, according to the present invention.
Figure 2:
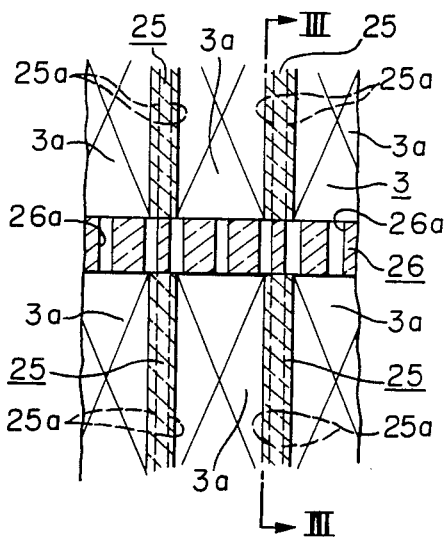
FIG. 2 is an enlarged cross-sectional view of an important of the superconducting field coil shown in FIG. 1.
Figure 3:
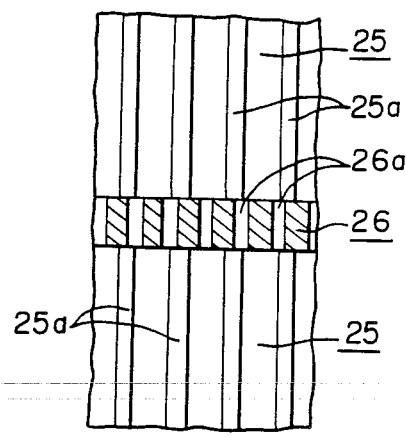
FIG. 3 is a cross-sectional view taken along the line III—III in FIG. 2.

In the following, the first embodiment of the present invention will be described with reference to FIGS. 1 to 3, wherein the same reference numerals as in FIGS. 27 to 31 designate the same or corresponding parts.

A superconducting field coil 3 is formed by winding a superconducting wire in plural lines (or tows) and layers, the superconducting wire being formed by twisting a plurality of wire elements. Numerals 25 designate in-line insulators formed of a grooved insulating material such as a glass-fabric reinforced epoxy laminate plate. Each of the in-line insulators is inserted between adjacent lines of the wound superconducting wire 3a and is provided with at least one groove 25a extending in the vertical direction in FIG. 1. Numerals 26 designate layer insulators formed of a perforated insulating material such as a glass-fabric reinforced epoxy laminate plate having a plurality of apertures 26a. Each of the layer insulators is inserted between vertically adjacent layers of the wound superconducting wire 3a in a multiple stage in the circumferential direction of the superconducting field coil 3. The superconducting field coil 3 is formed by winding a single superconducting wire 3a while each of the in-line insulators 25 is inserted the adjacent lines of the wire 3a and each of the layer insulators 26 is inserted between the vertically adjacent layers of the superconducting wire 3a, so that the single wire wound in the form of a coil is surrounded by the in-line insulators 25 and the layer insulators 26 to prevent the short circuit of the wire 3a. In the embodiment of the present invention, the impregnation of an epoxy resin is not carried out for the superconducting field coil 3. Since the superconducting wire 3a is a twisted wire, minute gaps exist between the superconducting wire 3a and the in-line insulators 25 and between the wire 3a and the layer insulators 26.

Cooling of the superconducting field coil 3 is carried out as follows. Liquid helium as a cooling medium flows along the outer surface of the superconducting field coil 3 and, at the same time, it flows around the wound superconducting wire 3a through the minute gaps between the twisted wire 3a and the insulators 25, 26, and through the grooves 25a in the line insulators 25 and apertures 26a in the layer insulators 26, whereby the wound superconducting wire 3a constituting the superconducting field coil 3 is directly cooled over the entire surface by the helium. Accordingly, heat produced in the superconducting wire 3a can be quickly eliminated by the liquid helium. Accordingly, temperature rise in the superconducting wire 3a is extremely small and the quenching does not take place.

Figure 4:
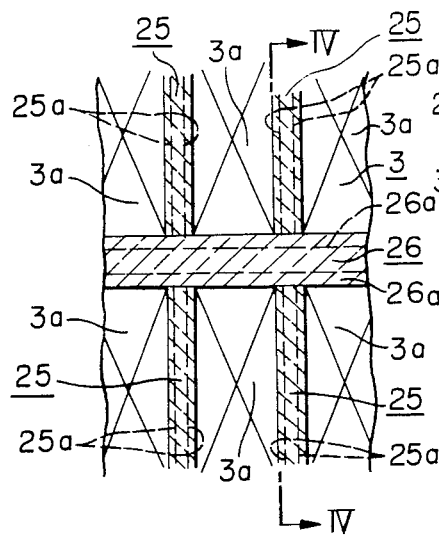
FIG. 4 is an enlarged cross-sectional view of the second embodiment of the superconducting field coil mounted on the rotor according to the present invention.
Figure 5:
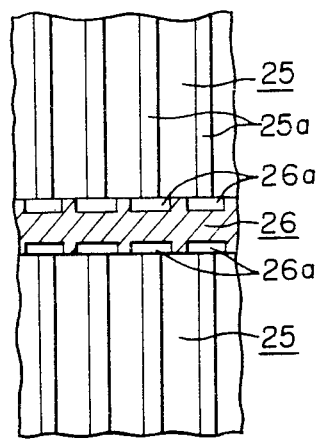
FIG. 5 is a cross-sectional view taken along the line IV—IV in FIG. 4.

FIGS. 4 and 5 show the second embodiment of the cooling structure for the superconducting field coil according to the present invention.

The construction of the second embodiment is substantially the same as that of the first embodiment provided that both the in-line insulators 25 and the layer insulators 26 are respectively provided with at least one vertical groove 25a and lateral groove 26a. Accordingly, the same reference numerals as in FIGS. 2 and 3 designate the same or corresponding parts.

Particularly, as shown in FIG. 5, the grooves 26a formed in the longitudinal direction of the layer insulators 26 is adapted to be communicated with the grooves 25a of the in-line insulators 25 which intersect with the layer insulators in the vertical direction.

Figure 6:
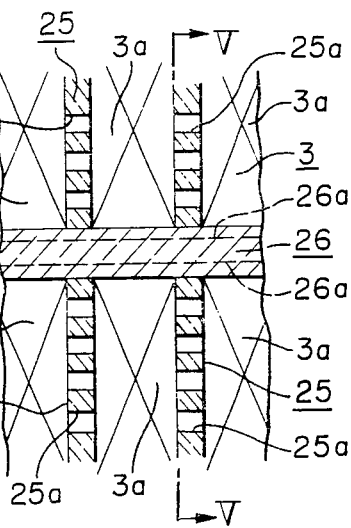
FIG. 6 is an enlarged cross-sectional view of the third embodiment of the superconducting field coil on the rotor according to the present invention.
Figure 7:
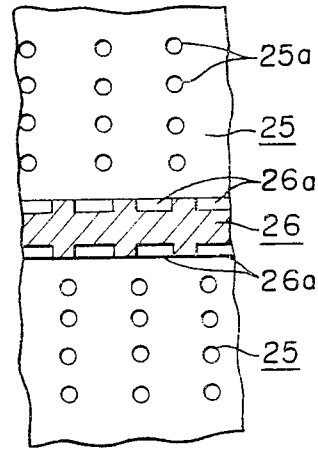
FIG. 7 is a cross-sectional view taken along the line V—V in FIG. 6.

FIGS. 6 and 7 show the third embodiment of the present invention. The third embodiment comprises a plurality of in-line insulators 25 formed of a perforated insulating material and having a plurality of apertures 25a, and a plurality of the layer insulators 26 formed of a grooved insulating material which is the same as that used in the first and second embodiments. Accordingly, the superconducting field coil 3 is cooled by the liquid helium as a cooling medium which covers the outer surface of the coil 3 and surface of the superconducting wire along its entire surface by passing through the apertures 25a of the in-line insulators 25 and the grooves 26a of the layer insulators 26, and which flows along the minute gaps on the twisted superconducting wire 3a.

Figure 8:
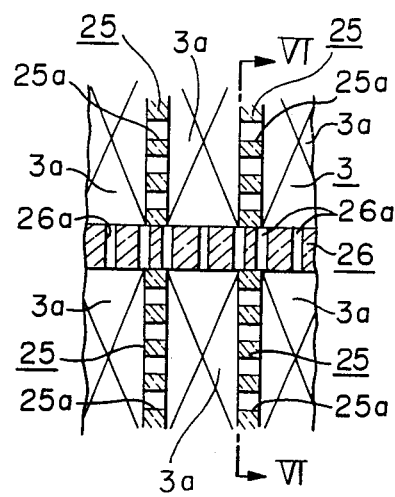
FIG. 8 is an enlarged cross-sectional view of the fourth embodiment of the superconducting field coil on the rotor according to the present invention.
Figure 9:
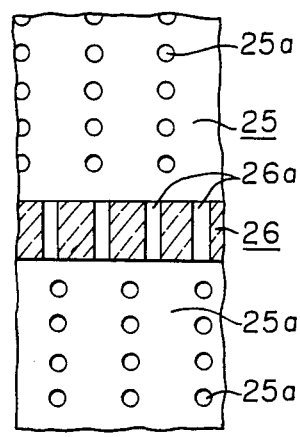
FIG. 9 is a cross-sectional view taken along the line VI—VI in FIG. 8.

FIGS. 8 to 9 show the fourth embodiment of the present invention.

The structure of the fourth embodiment is substantially same as that of the third embodiment provided that the in-line insulators 25 and the layer insulators 26 are constituted by the perforated insulating material.

In the fourth embodiment, the liquid helium as a cooling medium flows along the outer surface of the superconducting field coil 3 to cool it. The liquid helium also flows through the minute gaps between the twisted superconducting wire 3a and the surfaces of the in-line and layer insulators 25, 26 and passes through the apertures 25a, 26a of the in-line and layer insulators 25, 26, whereby the surface of the superconducting wire 3a is cooled.

In the first to third embodiments, the insulating material having the grooves 26a in both surfaces is used for the in-line insulators and/or the layer insulators. However, the insulating material having the grooves in its one surface may be used.

As described above, in accordance with the first to fourth embodiments of the present invention, the liquid helium directly cools the superconducting wire constituting the superconducting field coil through the grooves and/or apertures formed in the in-line insulators and/or the layer insulators, whereby there is obtainable a rotor for a superconducting electric rotary machine which improves cooling and prevents the occurrence of quenching.

Figure 10:
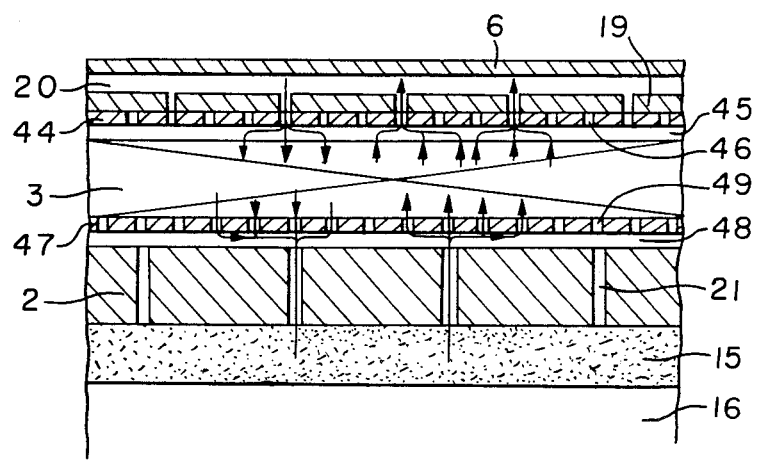
FIG. 10 is a longitudinal cross-sectional view of the fifth embodiment of the superconducting field coil on the rotor according to the present invention.

FIG. 10 shows the fifth embodiment of the rotor having a cooling structure for the superconducting field coil according to the present invention. In FIG. 10, reference numerals 2, 3, 6, 15, 16, 19, 20 and 21 designate the same parts as those in FIGS. 27 to 31.

In FIG. 10, a reference numeral 44 designates an upper insulating packing in contact with the outer circumferential surface of the superconducting field coil 3 with respect to the coil supporting tube 2. The upper insulating packing 44 has a surface in contact with the superconducting field coil 3 in which a plurality of first grooves 45 are formed in the axial direction with respect to the axial center of the rotor and in the circumferential direction of the coil 3. A number of small holes 46 are formed in the first grooves, some of the holes being formed so as to communicate in agreement with small gaps in the wedge 19. A lower insulating packing 19 is in contact with the inner circumferential surface of the superconducting field coil 3 with respect to the coil supporting tube 2. The lower insulating packing 47 has a surface which is not in contact with the inner circumferential surface of the coil 3, in which a plurality of second grooves 48 are formed in the axial direction with respect to the axial center of the rotor and in the circumferential direction of the coil 3. A number of small holes 49 are formed in the second grooves 48, some of the small holes communicating with the helium passages 21 formed in the coil supporting tube 2.

The operation of the fifth embodiment having the construction as above-mentioned will be described.

Heat in the superconducting field coil 3 is absorbed by the liquid helium existing in the minute gaps of the coil 3. The volume of the helium expands by absorbing the heat, and a part of the helium having a small density moves to the liquid storing section 15 through a course of the second small holes 49 in the lower insulating packing 47, the second grooves 48 and the helium passage 21 in the coil supporting tube 2, due to natural convection in a centrifugal force field. Shortage of the helium takes place around the superconducting field coil 3. However, such shortage of the helium is compensated by helium flowing in the area through a course of the opening 20, the gaps in the wedge 19, the first small holes 46 in the upper insulating packing 44 and the first grooves 45 in the upper insulating packing 44. A part of the helium having subjected to heat expansion is evaporated in the helium liquid storing section 15 whereby the temperature of the helium is reduced. The cooled helium is supplied to the area surrounding the superconducting field coil through another helium passage 21, the second grooves 48 in the lower insulating packing 47 and the second small holes 49 in the packing 47. The helium further flows through the first grooves 45 in the upper insulating packing 44, the first small holes 46, the small gaps in the wedge 19 toward the openings 20. Thus, a smooth natural convection of the helium cools the coil 3 and keep the temperature of the coil 3 at the superconducting transition temperature or lower.

Figure 11:
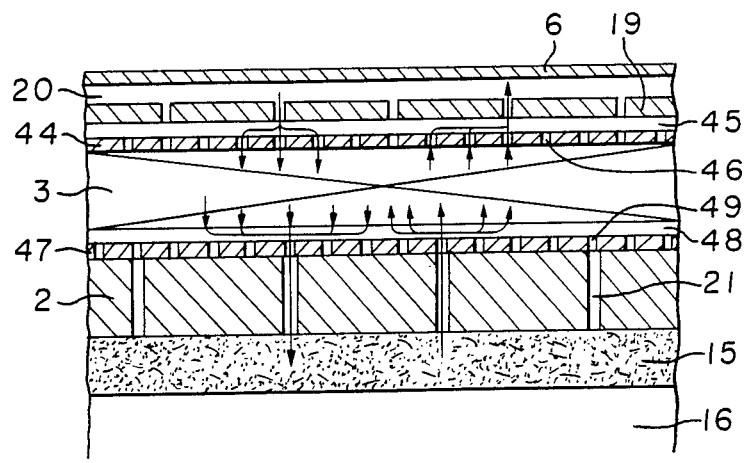
FIG. 11 is a cross-sectional view similar to FIG. 10 of the sixth embodiment according to the present invention.

FIG. 11 shows the sixth embodiment of the present invention.

The structure of the sixth embodiment is substantially same as that of the fifth embodiment shown in FIG. 10 provided that the lower insulating packing 47 has a surface in contact with the superconducting field coil 3, in which a plurality of second grooves 48 are formed in the axial direction with respect to the axial center of the rotor and in the circumferential direction of the coil 3. A number of the second small holes 49 are formed in the second grooves 48, some of the small holes communicating in agreement with the helium passages 21 in the coil supporting tube 2.

The function and effect of the sixth embodiment are the same as those of the fifth embodiment.

Figure 12:
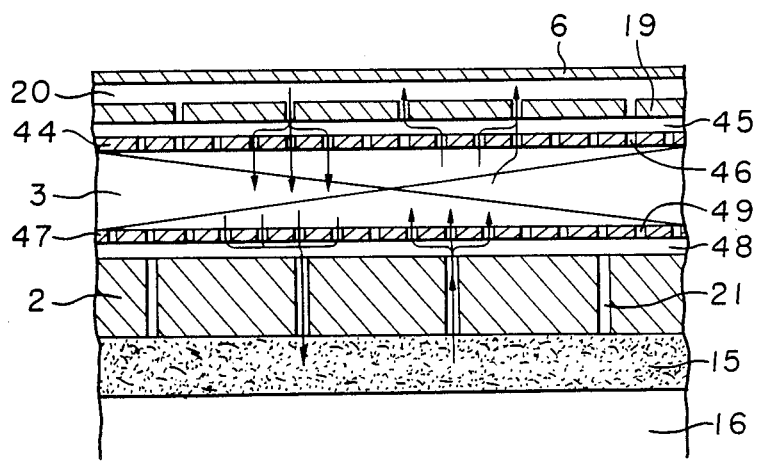
FIG. 12 is a cross-sectional view similar to FIGS. 10 and 11 of the seventh embodiment of the present invention.

FIG. 12 shows the seventh embodiment of the present invention. In the seventh embodiment, the surface of the upper insulating packing 44, which is opposite the surface having the first grooves 45 formed in the axial direction with respect to the axial center and the circumferential direction of the coil 3, i.e. the surface without the first grooves 45, is in contact with the superconducting field coil 3, and the surface of the lower insulating packing 47, which is opposite the surface having the second grooves 48 formed in the axial direction and the circumferential direction, i.e. the surface without having the second grooves 48, is in contact with the coil 3. A number of first small holes 46 are formed in the first grooves 45, some of the first small holes 46 communicating with the gaps in the wedge 19. Similarly, a number of second small holes 49 are formed in the second grooves 48, some of the second small holes 49 communicating in agreement with the helium passages 21 formed in the coil supporting tube 2. Accordingly, the seventh embodiment performs the same function and effect as the fifth and sixth embodiments.

Figure 13:
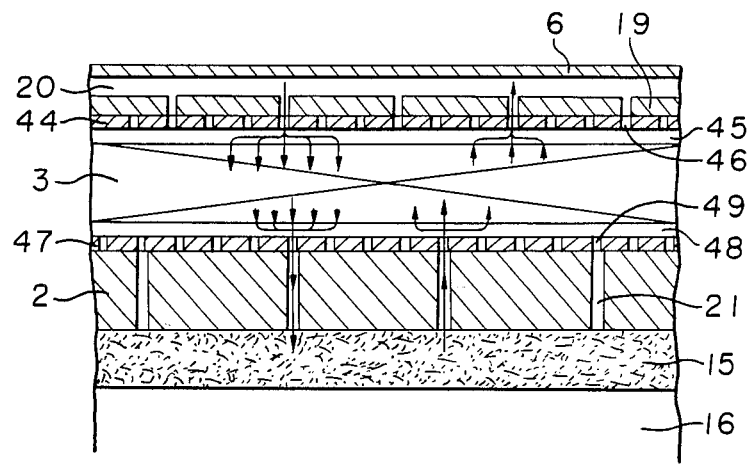
FIG. 13 is a cross-sectional view similar to FIGS. 10 to 12 of the eighth embodiment of the present invention.

FIG. 13 shows the eighth embodiment of the present invention.

In the eighth embodiment, the surface of the upper insulating packing 44, in which the first grooves 45 are formed in the axial direction with respect to the coil supporting tube 2 and in the circumferential direction of the coil 3, is in contact with the coil 3, and the surface of the lower insulating packing 47 having the second grooves 48 which are formed in the axial direction and the circumferential direction, is in contact with the coil 3. A number of small holes 46 are formed in the first grooves 45, and a number of small holes 49 are formed in the second grooves 48 of the lower insulating packing 47, some of the small holes 46, 49 communicating with the small gaps in the wedge 19 and the helium passages 21, respectively. Accordingly, the function and effect of the eighth embodiment are the same as those of the fifth to seventh embodiments.

Figure 14:
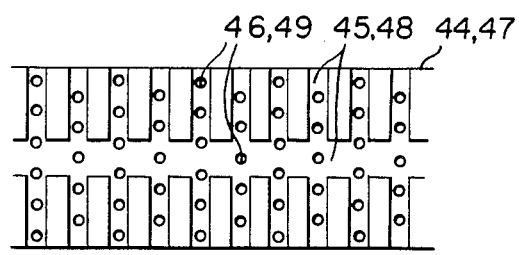
FIG. 14 is a plane view showing an upper and lower insulating packing used for the superconducting field coil shown in FIGS. 10 to 13.

FIG. 14 shows the upper and lower insulating packings in accordance with the fifth to eighth embodiments of the present invention.

Thus, in accordance with the fifth to eighth embodiments of the present invention, the upper and lower insulating packings are respectively provided with each one surface in which at least one groove is formed in the axial direction of the coil supporting tube and at least one groove is formed in the circumferential direction of the coil, and a number of small holes formed in the grooves so as to communicate with the other surface. Further, the surfaces with grooves are placed in same or reverse side with respect to the superconducting field coil. Accordingly, helium flows in both the axial and circumferential directions so that heat produced in the coil 3 can be efficiently removed, whereby the cooling properties of the coil are improved.

FIGS. 15 to 20 show the ninth embodiment of a structure for cooling the superconducting field coil according to the present invention. In the Figures, numerals 2, 3, 6, 15, 16, 17, 19, 20 and 21 designate the same or corresponding parts as in FIGS. 1 to 16.

Figure 15:
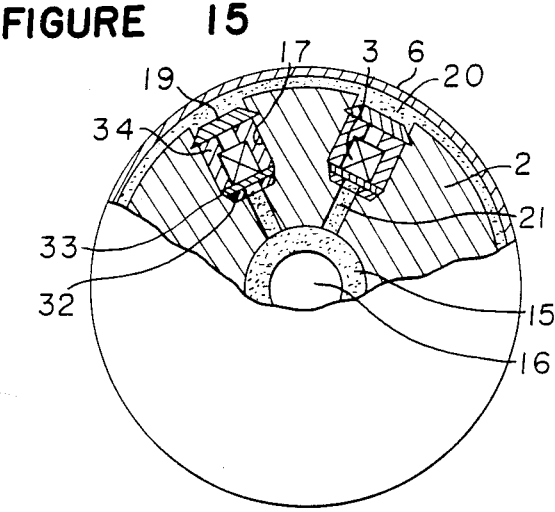
FIG. 15 is a cross-sectional view showing a rotor for a superconducting electric rotary machine according to the ninth embodiment of the present invention.
Figure 16:
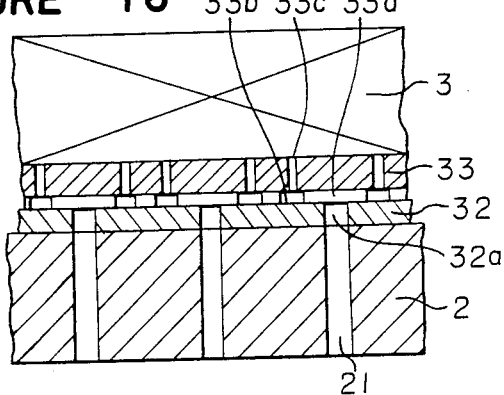
FIG. 16 is an enlarged cross-sectional view partly omitted of the lower part of a superconducting field coil shown in FIG. 15.
Figure 17:
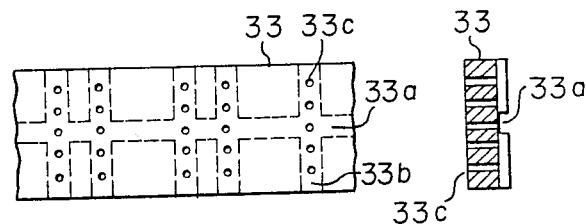
FIG. 17 is a front view of the outer layer of a lower insulating packing shown in FIG. 16.
Figure 18:
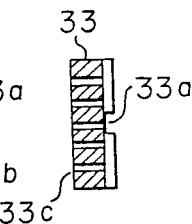
FIG. 18 is a cross-sectional view of the outer layer of the lower insulating packing shown in FIG. 16.
Figure 28:
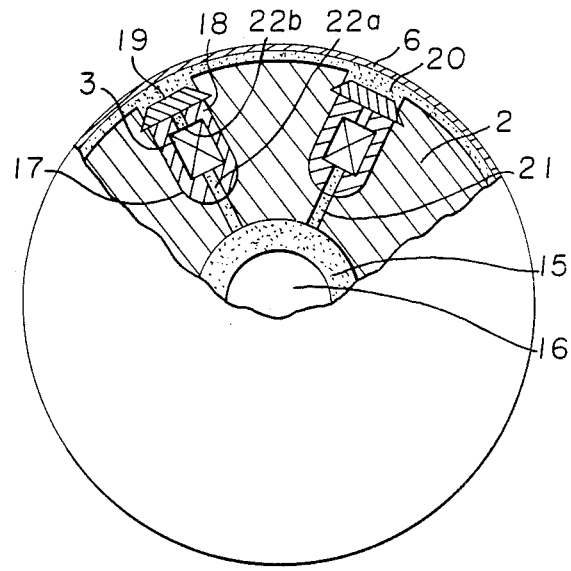
FIG. 28 is a cross-sectional view taken along the line VII—VII in FIG. 27.
Figure 29:
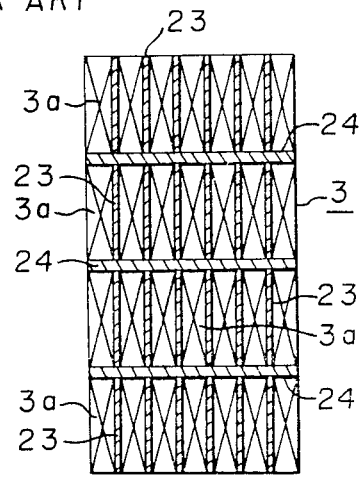
FIG. 29 is a diagram in cross-section showing the conventional superconducting field coil.
Figure 30:
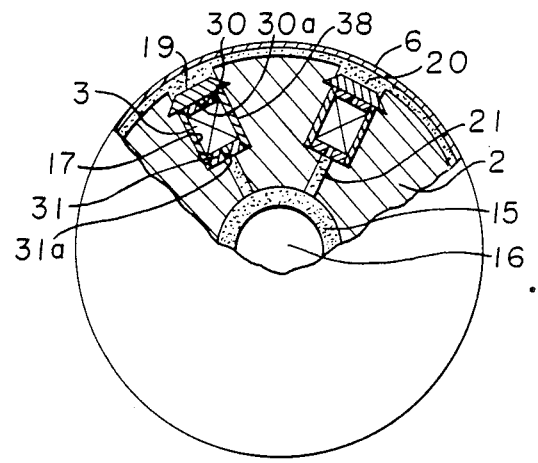
FIG. 30 a transverse cross-sectional view of the conventional rotor for the superconducting electric rotary machine.
Figure 31:
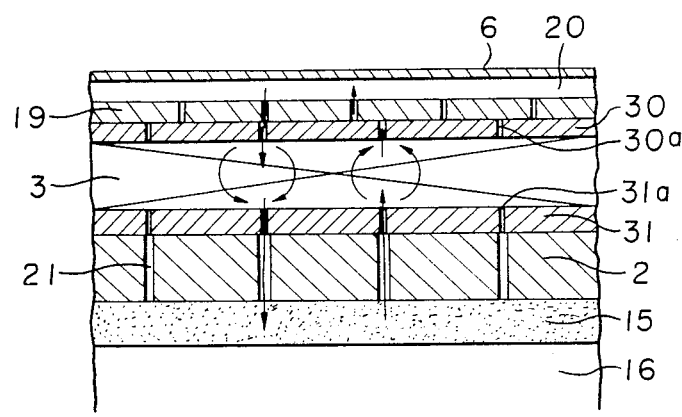
FIG. 31 is a diagram in cross-section and partly omitted of the conventional rotor for the superconducting electric machine.

In FIG. 15, a numeral 33 designates an upper layer of a lower insulating packing. The upper layer 33 is in contact with the lower circumferential surface of the superconducting field coil 3. A numeral 32 designates a lower layer of the lower insulating packing. The lower layer 32 of the lower insulating packing is provided with through holes 32a which extends in the radial direction with respect to the coil supporting tube 2 so as to communicate with the helium passages formed in the coil supporting tube 2. The upper layer 33 of the lower insulating packing is provided with at least one first groove 33a formed in its lower surface so as to extend in the axial direction with respect to the coil supporting tube 2 and to communicate with the through holes 32a of the lower layer 32, second grooves 33b formed in its lower surface so as to cross the first grooves 33a and to be laterally shifted from the radially extending through holes 32a of the lower layer 32, and through holes 33c which extend in the radial direction with respect to the coil supporting tube 2 and communicate with the second grooves 33b. FIG. 17 is a plane view of the upper layer 33; FIG. 18 is a cross-sectional view of the upper layer; FIG. 19 is a plane view of the lower layer and FIG. 20 is a cross-sectional view of the lower layer.

In the construction as above-mentioned, since radially extending through-holes 33c of the upper layer 33 are shifted in the axial direction of the rotor from the radially extending through-holes 32a of the lower layer, both through-holes 33c, 32a communicating with each other through the first and second grooves formed in the lower surface of the upper layer of the lower insulating packing, the creepage distance for electric insulation of the lower insulating packing can be increased without enlarging the thickness of the packing. Accordingly, the volume of the lower insulating packing can be relatively small and the volume of the superconducting field coil 3 can be relatively large, hence, the capacity of the coil can be increased.

FIGS. 21 to 26 show the tenth embodiment of the present invention. In the Figures, the same reference numerals as in FIGS. 15 to 20 designate the same parts. In FIG. 21, numeral 35 designates a lower layer of the upper insulating packing. The lower layer 35 is in contact with the upper circumferential surface of the superconducting field coil 3. A numeral 36 designates an upper layer of the upper insulating packing.

In the tenth embodiment, the upper layer 36 of the upper insulating packing is provided with through holes 36a extending in the radial direction with respect to the coil supporting tube 2. The lower layer 35 of the upper insulating packing is provided with at least one first groove 35a extending in the axial direction with respect to the axial center of the rotor so as to communicate with the radially extending through holes 36a of the upper layer 36, at least one second groove 35b extending in the circumferential direction of the coil 3 and to cross the first groove 35a and a plurality of through holes 35c formed in the second grooves and extending in the radial direction. By superimposing the upper and lower layers of the upper insulating packing, crank-like helium passages are formed in the packing. The radially extending through holes 35c in the upper layer are communicated in agreement with small gaps in the wedge 19.

The function and effect of the tenth embodiment is substantially same as those in the ninth embodiment.

Obviously, numerous modifications and variations of the present invention are possible in light of the above teachings. It is therefore to be understood that within the scope of the appended claims, the invention may be practiced otherwise than as specifically described herein.

What is claimed is:

1. A rotor for a superconducting electric rotary machine comprising a coil supporting tube, a superconducting field coil which is formed by winding a superconducting wire around said coil supporting tube in plural numbers of lines and layers with in-line insulators between the laterally adjacent lines of the wound wire and layer insulators between the vertically adjacent layers of the wound wire of said coil, said in-line insulators and said layer insulators being formed by an insulating material having channels formed therein, said channels being in the form of grooves and perforations.

2. The rotor according to claim 1, wherein said grooved insulating material and said perforated insulating material are made of a glass-fabric reinforced epoxy laminate plate.

3. A rotor for a superconducting electric rotary machine comprising a coil supporting tube, a superconducting field coil held in a slot formed in said coil supporting tube and upper and lower insulating packings respectively placed on the outer, and inner circumferential surfaces of said superconducting coil, wherein each of said upper and lower insulating packings is provided with a surface having at least one groove formed in the axial direction of said coil supporting tube and at least one groove formed in the circumferential direction of said coil, and a plurality of holes formed in said grooves so as to communicate with the other surface.

4. A rotor for a superconducting electric rotary machine comprising a coil supporting tube, a superconducting field coil held in a slot formed in said coil supporting tube and an insulating filler packed in a space in said slot to hold said coil, wherein an insulating packing is placed on one of the circumferential surfaces of said superconducting field coil with respect to the radial direction of said coil supporting tube; said insulating packing comprises an upper layer and a lower layer which are superimposed in said radial direction, and at least one helium-feeding channel having two portions joined by a portion perpendicular thereto formed in said superimposed upper and lower layers.

5. The rotor according to claim 4, wherein the insulating packing is the lower insulating packing and the upper layer of the lower insulating packing is in contact with the lower surface of said superconducting field coil and the lower layer of the lower insulating packing is in contact with said coil supporting tube, and wherein said lower layer is provided with a through hole which exceeds in the radial direction with respect to said coil supporting tube and which is communicated with said first groove of said upper layer and a helium passage formed in said coil supporting tube to feed helium, and said upper layer is provided with a first groove formed in its lower surface so as to extend in the axial direction of said coil supporting tube and to be communicated with said through hole of said lower layer, a second groove formed in its lower surface so as to cross said first groove and to be laterally shifted from said radially extending through hole of said lower layer and a through hole which extends in the radial direction with respect to said coil supporting tube and is communicated with said second groove.

6. The rotor according to claim 4, wherein the insulating packing is the upper insulating packing and the upper layer of said upper insulating packing is in contact with a wedge placed at the upper portion of said slot and the lower layer of said upper insulating packing is in contact with the upper surface of said superconducting field coil, and wherein said lower layer is provided with a through hole which exceeds in the radial direction with respect to said coil supporting tube, a first groove formed in its upper surface in the direction of the circumferential direction of said superconducting field coil so as to be communicated with said radially extending through hole and a second groove formed in its upper surface in the axial direction with respect to said tube so as to cross said first groove, and said upper layer of said upper insulating packing is provided with a through hole which extends in the radial direction with respect to the coil supporting tube and which is communicated with a helium passage formed in said wedge.

* * * * *